US012613973B2

(12) United States Patent
Misra et al.

(10) Patent No.: US 12,613,973 B2
(45) Date of Patent: Apr. 28, 2026

(54) SYSTEM AND A METHOD FOR MANAGING KNOWLEDGE FOR SOLVING VULNERABLE ISSUES USING ORGANIZATIONAL KNOWLEDGE BASE

(71) Applicant: ArmorCode Inc., Fremont, CA (US)

(72) Inventors: Anant Misra, Cupertino, CA (US);
Nikhil Gupta, Saratoga, CA (US);
Praneet Khare, Bangalore (IN);
Deepak Yadav, Gurgaon (HR)

(73) Assignee: ArmorCode Inc., Fremont, CA (US)

( * ) Notice: Subject to any disclaimer, the term of this patent is extended or adjusted under 35 U.S.C. 154(b) by 245 days.

(21) Appl. No.: 18/366,536

(22) Filed: Aug. 7, 2023

(65) Prior Publication Data

US 2025/0053662 A1     Feb. 13, 2025

Related U.S. Application Data

(60) Provisional application No. 63/349,567, filed on Jun. 6, 2022.

(51) Int. Cl.
*G06F 21/57* (2013.01)
*G06N 5/022* (2023.01)

(52) U.S. Cl.
CPC ........... *G06F 21/577* (2013.01); *G06N 5/022* (2013.01); *G06F 2221/034* (2013.01)

(58) Field of Classification Search
CPC .. G06F 21/577; G06F 2221/034; G06N 5/022
(Continued)

(56) References Cited

U.S. PATENT DOCUMENTS

| | | | |
|---|---|---|---|
| 11,729,198 B2 * | 8/2023 | Kuppa ................... | G06N 5/022 |
| | | | 726/25 |
| 2007/0136622 A1 * | 6/2007 | Price ..................... | G06Q 10/06 |
| | | | 702/108 |

(Continued)

FOREIGN PATENT DOCUMENTS

| | | | | |
|---|---|---|---|---|
| WO | WO-2014021866 A1 * | 2/2014 | ........... | G06F 21/577 |

OTHER PUBLICATIONS

'What is an SLA and why is it necessary for ticket management systems?', Mint Service Desk, https://www.mintsd.com/blog/what-is-an-sla-and-why-is-it-necessary-for-ticket-management-systems, Feb. 11, 2022 (Year: 2022).*

(Continued)

*Primary Examiner* — Catherine Thiaw
*Assistant Examiner* — Amir Mahdi Hajiabbasi
(74) *Attorney, Agent, or Firm* — Dickinson Wright PLLC

(57) ABSTRACT

The embodiments herein provide a method for managing knowledge for solving vulnerability issues using an organizational knowledgebase. The method includes linking a vulnerability management platform knowledgebase (KB) article to an organization's core documents. The method further includes applying a vulnerability management platform formula, to enhance the knowledge management and security practices within the organization's knowledgebase. The method for applying the vulnerability management platform formula comprises tagging (CVEs) or (CWEs), to the vulnerability platform knowledgebase (KB) articles; attaching rich articles as links to a ticket tracking system; linking the vulnerability management platform KB articles to a new ticket created; and automatically linking a code commit to the vulnerability management platform KB articles. The method further comprises defining and configuring a plurality of Service Level Agreements (SLAs) at an (Continued)

application or sub-application level to set acceptable time-lines for acknowledging and mitigating security concerns.

14 Claims, 7 Drawing Sheets

(58) Field of Classification Search
USPC ........................................................... 726/25
See application file for complete search history.

(56) References Cited

U.S. PATENT DOCUMENTS

| | | | |
|---|---|---|---|
| 2017/0063650 A1* | 3/2017 | Chavali ............... | H04L 41/5074 |
| 2018/0324056 A1* | 11/2018 | Occhialini .......... | H04L 41/5006 |
| 2019/0392137 A1* | 12/2019 | Beskrovny ........... | G06F 21/554 |
| 2020/0050770 A1* | 2/2020 | Inagaki ................ | G06F 21/577 |
| 2020/0175174 A1* | 6/2020 | Bakalli ..................... | G06F 8/71 |
| 2020/0242254 A1* | 7/2020 | Velur ................... | G06F 21/577 |
| 2021/0019423 A1* | 1/2021 | DuBois ................ | G06F 21/552 |
| 2021/0110047 A1* | 4/2021 | Fang ....................... | G06F 16/27 |
| 2021/0173935 A1* | 6/2021 | Ramasamy .......... | G06F 21/577 |
| 2022/0004645 A1* | 1/2022 | Agarwwal ........... | H04L 41/145 |
| 2022/0019676 A1* | 1/2022 | Guo ...................... | G06F 21/577 |
| 2022/0067204 A1* | 3/2022 | Hadar ................... | G06N 20/00 |
| 2023/0205892 A1* | 6/2023 | Wareus ................ | G06F 21/577 |
| | | | 726/25 |
| 2024/0095753 A1* | 3/2024 | Solanki .................. | H04L 41/22 |

OTHER PUBLICATIONS

ÂNational Checklist Program Checklist Repositoryâ, NIST, https://ncp.nist.gov/repository, Jul. 30, 2021 (Year: 2021).*

* cited by examiner

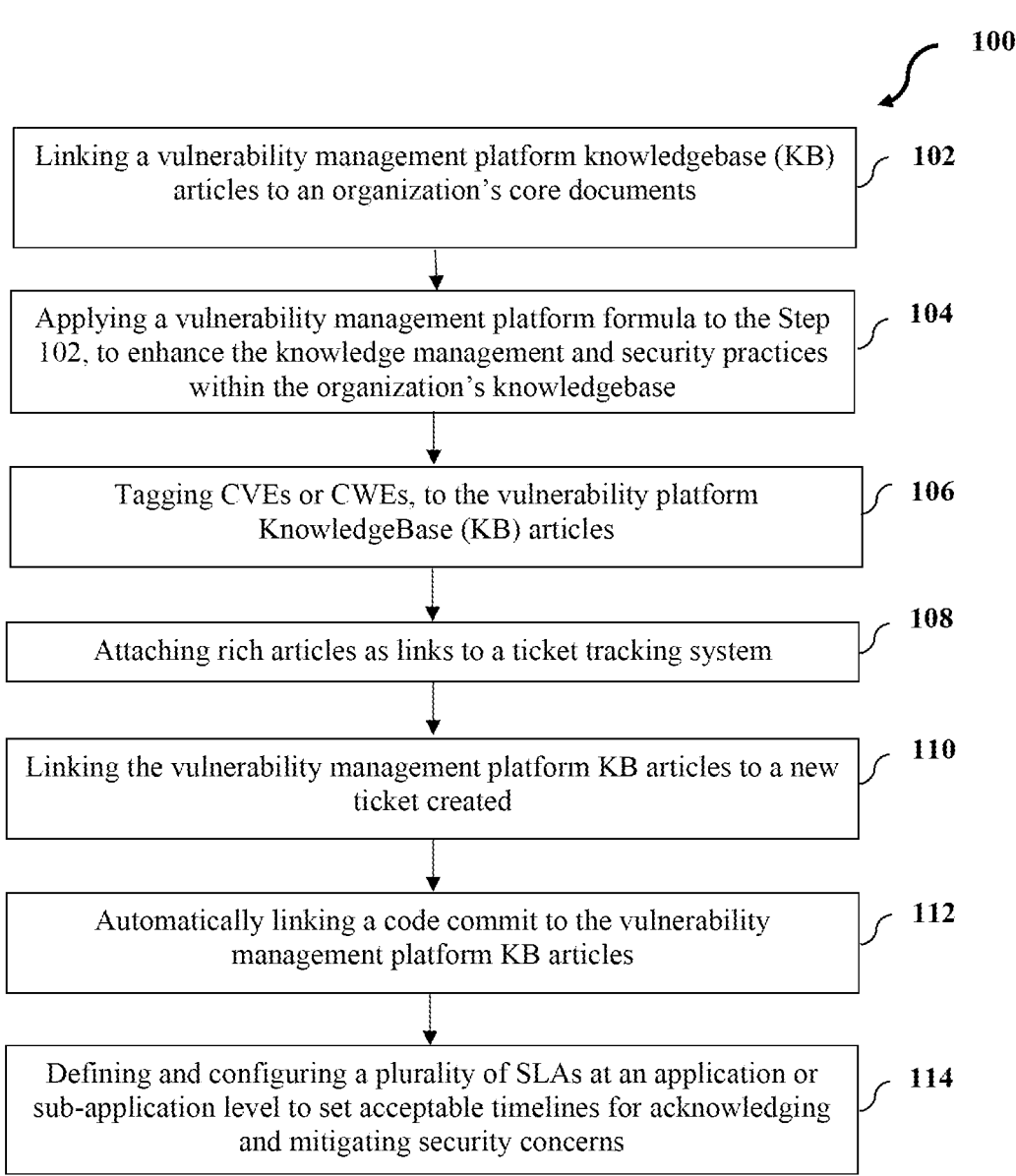

100

Linking a vulnerability management platform knowledgebase (KB) articles to an organization's core documents — 102

Applying a vulnerability management platform formula to the Step 102, to enhance the knowledge management and security practices within the organization's knowledgebase — 104

Tagging CVEs or CWEs, to the vulnerability platform KnowledgeBase (KB) articles — 106

Attaching rich articles as links to a ticket tracking system — 108

Linking the vulnerability management platform KB articles to a new ticket created — 110

Automatically linking a code commit to the vulnerability management platform KB articles — 112

Defining and configuring a plurality of SLAs at an application or sub-application level to set acceptable timelines for acknowledging and mitigating security concerns — 114

FIG 1

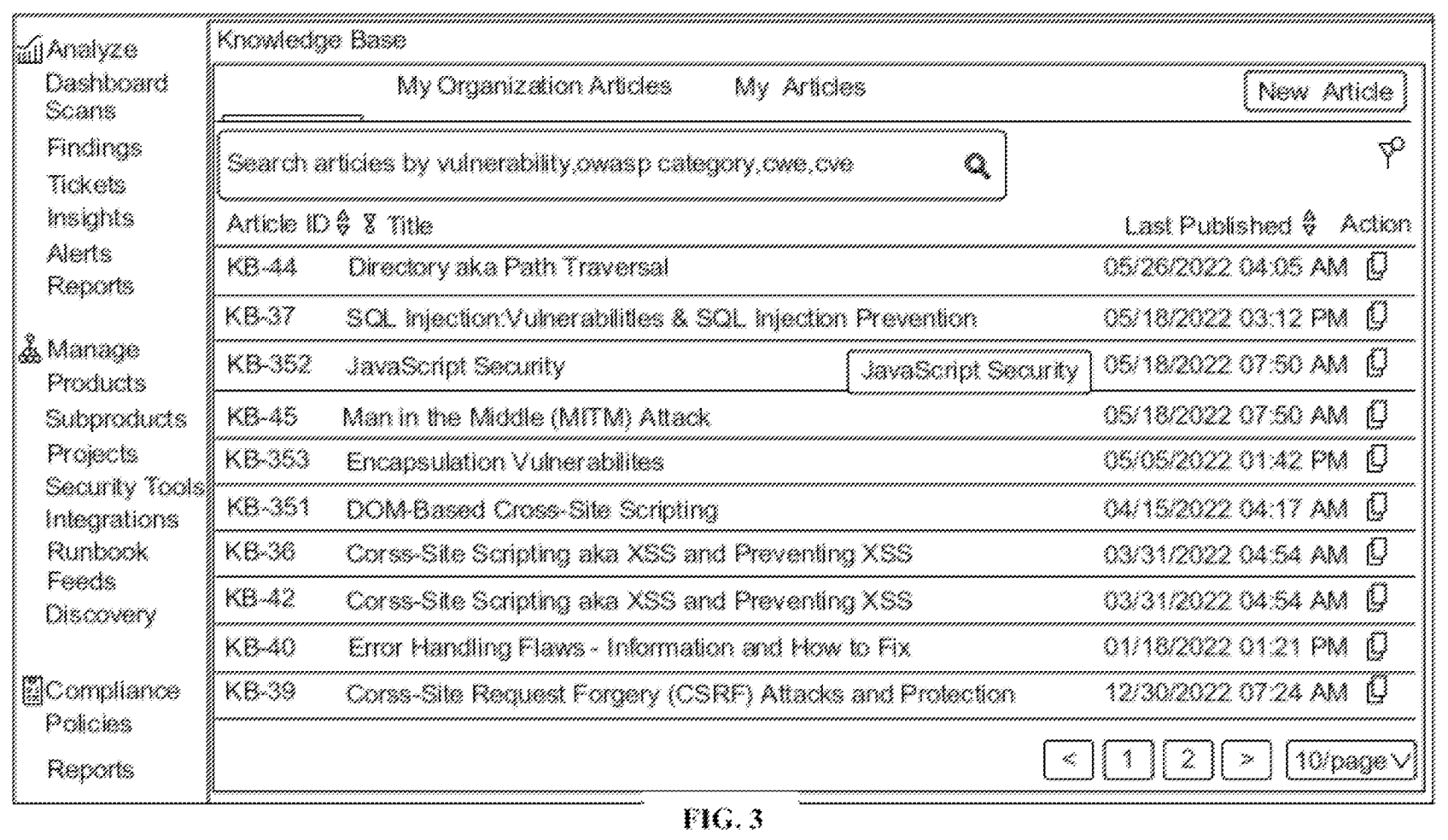

Knowledge Base

My Organization Articles    My Articles

New Article

Search articles by vulnerability.owasp.category.cwe.cve

| Article ID | Title | Last Published | Action |
|---|---|---|---|
| KB-44 | Directory aka Path Traversal | 05/26/2022 04:05 AM | |
| KB-37 | SQL Injection:Vulnerabilities & SQL Injection Prevention | 05/18/2022 03:12 PM | |
| KB-352 | JavaScript Security | 05/18/2022 07:50 AM | |
| KB-45 | Man in the Middle (MITM) Attack | 05/18/2022 07:50 AM | |
| KB-353 | Encapsulation Vulnerabilities | 05/05/2022 01:42 PM | |
| KB-351 | DOM-Based Cross-Site Scripting | 04/15/2022 04:17 AM | |
| KB-38 | Corss-Site Scripting aka XSS and Preventing XSS | 03/31/2022 04:54 AM | |
| KB-42 | Corss-Site Scripting aka XSS and Preventing XSS | 03/31/2022 04:54 AM | |
| KB-40 | Error Handling Flaws - Information and How to Fix | 01/18/2022 01:21 PM | |
| KB-39 | Corss-Site Request Forgery (CSRF) Attacks and Protection | 12/30/2022 07:24 AM | |

JavaScript Security

< | 1 | 2 | > | 10/page

Analyze
Dashboard
Scans
Findings
Tickets
Insights
Alerts
Reports

Manage
Products
Subproducts
Projects
Security Tools
Integrations
Runbook
Feeds
Discovery Compliance
Policies
Reports

FIG. 3

Analyze
Dashboard
Scans
Findings
Tickets
Insights
Alerts
Reports

Manage
Products
Subproducts
Projects
Security Tools
Integrations
Runbook
Feeds
Discovery Compliance
Policies
Reports
[Feedback]

SQL Injection: Vulnerabilities & SQL Injection Prevention V2
Published 8 months ago Description   Related Commits   Discuss this Article What is SQL Injection?
SQL Injection Attacks, commonly known as SQLi Attacks, are a sort of website and Web code vulnerability that allows attackers to conceal the backend operations and get access to, extract and delete confidential information from their databases.
Although attacks by SQLi may be harmful, they're easy to find and prevent if you know how.
Types of SQL Injection?
1. In-band SQLi(Classic SQLi)
2. Error-based SQLi
3. Union-based SQLi
4. Inferential SQLi (Blind SQLi)
5. Boolean-based(content-based) Blind SQLi
6. Time-based Blind SQLi
7. Out-of-band SQLi SQL Injection Example in JAVA
CWE 89: SQL Injection flaws occur when you create a SQL statement by building a string that includes untrusted data, such as input from a web form, cookie, or URL query-string.

```
String accountBalanceQuery =
"SELECT accountNumber, balance FROM accounts
WHERE account_owner_id = "
+request. getParameter("user_id");
try {
Statement statement = connection.createStatement();
ResultSet cs = statement. executeQuery(accountBalanceQuery);
```

(AS) Abhinav Shah                    2
Senior Developer              Articles

CVE : CVE-2019-9948
CVE-2017-17458
CWE : 22  89  78  79  103  915
Keywords : CWE-89  sql injection
injection  sql Linked tickets(5)
OS Command Injection
AT-211
Findings: 54256174, 53655630 test
AT-37504
Findings: 54205617

Luis-Demo-Star
AT-62611
Findings: 55026384,55026358,
55026334

Mark's WebGoal Demo Ticket
ST-933

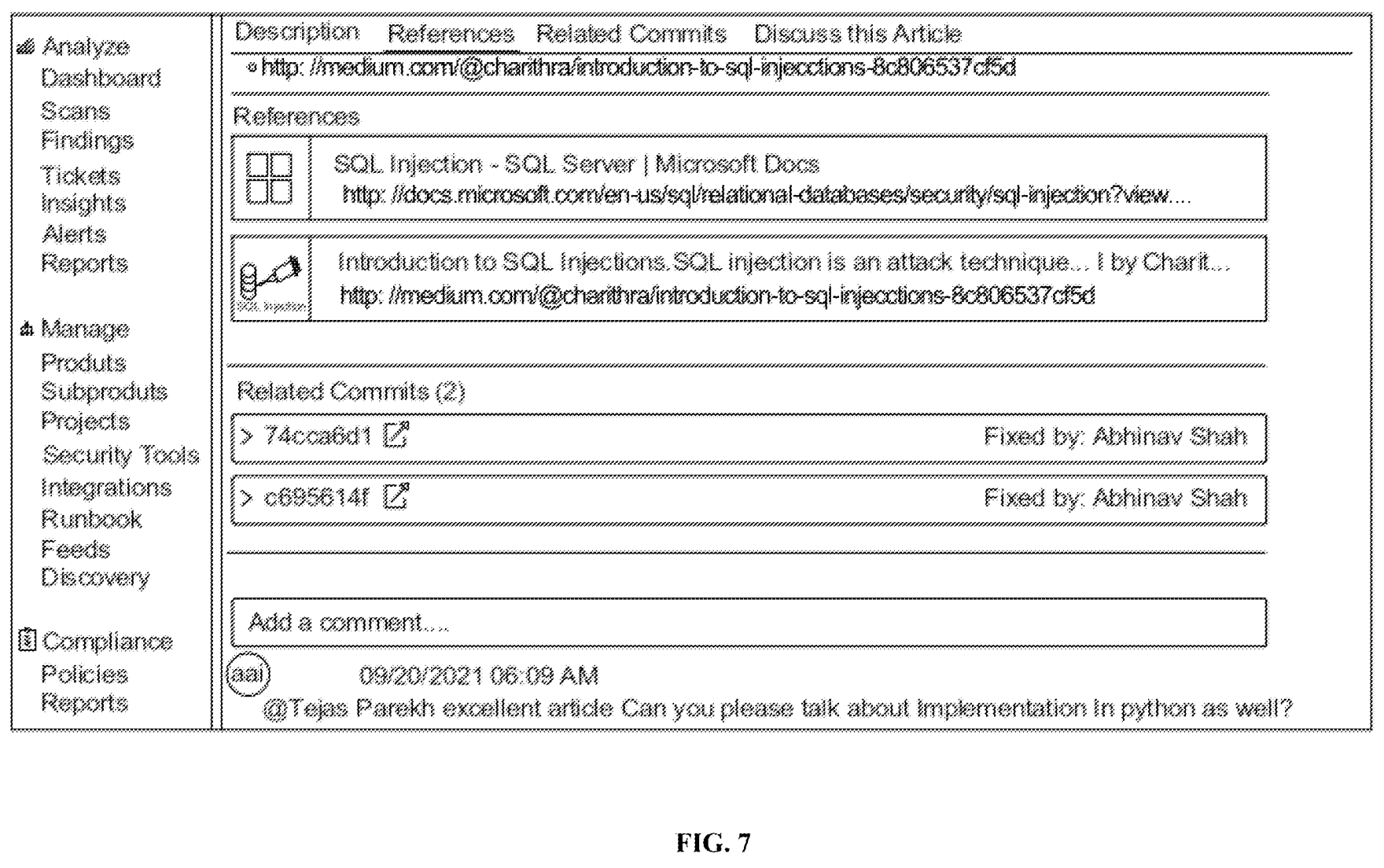

Analyze
Dashboard
Scans
Findings
Tickets
Insights
Alerts
Reports

Manage
Products
Subproducts
Projects
Security Tools
Integrations
Runbook
Feeds
Discovery Compliance
Policies
Reports Description   References   Related Commits   Discuss this Article

• http: //medium.com/@charithra/introduction-to-sql-injections-8c30b6537cf5d

References

SQL Injection - SQL Server | Microsoft Docs
http: //docs.microsoft.com/en-us/sql/relational-databases/security/sql-injection?view-...

Introduction to SQL Injections SQL injection is an attack technique... | by Charit...
http: //medium.com/@charithra/introduction-to-sql-injections-8c30b6537cf5d Related Commits (2)

> 74cca6d1     Fixed by: Abhinav Shah

> c685614f     Fixed by: Abhinav Shah

Add a comment...

09/20/2021 06:09 AM

@Tejas Parekh excellent article Can you please talk about implementation in python as well?

FIG. 7

SYSTEM AND A METHOD FOR MANAGING KNOWLEDGE FOR SOLVING VULNERABLE ISSUES USING ORGANIZATIONAL KNOWLEDGE BASE

CROSS-REFERENCE TO RELATED APPLICATIONS

The present application claims the priority from the Indian Provisional Application with Ser. No. 63/349,567 filed on Jun. 6, 2022, with the title "A METHOD FOR MANAGING KNOWLEDGE FOR SOLVING VULNER-ABLE ISSUES USING ORGANIZATIONAL KNOWL-EDGE BASE". The contents of the abovementioned Appli-cation are included in entirety as reference herein.

BACKGROUND

Technical Field

The embodiments herein are generally related to a field of security issues during application development. The embodiments herein are particularly related to a system and method for solving vulnerability issues using an organiza-tional knowledge base. The embodiments herein are more particularly a system and method for managing knowledge and documentation for solving vulnerability issues by inte-grating and linking vulnerabilities, tickets, and code com-mits in an intelligent way using a Knowledge Data Base (KB).

Description of the Related Art

Typically, with the rise of microservices, the amount of code being churned out has resulted in greater amounts of code being released. With the shortening of sprints, there is very little time left for creating and updating documentation. The agile manifesto adds fuel to the fire by promoting "working software over documentation." Further combining the above with increased churn in developers in an organi-zation. The developers take the tribal knowledge when they leave, and the new developers are overwhelmed with miss-ing documentation and knowledge. The code base at times is too large or complex or both to figure out how a vulner-ability was fixed in the past. It is like finding a needle in the haystack. Therefore, an easier way for developers is to go out and look for solutions on the internet. This can pose serious issues due to the code from outside may have even more security issues. The copied code may violate intellec-tual property (IP). The copied code may have functional issues and so while it may fix a vulnerability, it can poten-tially break functionality, requiring more testing/fixing cycles.

All of the above yield's significant delays in mitigation of serious vulnerabilities and the application and organization remains vulnerable for longer durations, which increases the chances of getting compromised by a huge amount. Further, there is a lot of knowledge buried deep inside different systems, as well as in the code. Currently, there are tools that can be used to manage documentation and knowledge but require a lot of manual effort to maintain over time. Also, there is information buried inside different systems that is difficult to correlate and easy to miss entirely over time. For example, there are a lot of useful discussions and decisions inside a JIRA ticket. In the vulnerability scanning tools, there is a great deal of information available for similar but slightly different vulnerabilities. In the code base, specific pieces of code is difficult to zero in on.

Hence, in view of this, there is a need for a method and a system for managing knowledge for solving vulnerability issues using organizational knowledgebase, to provide better security practices, improved collaboration, and proactive security measures.

The above-mentioned shortcomings, disadvantages and problems are addressed herein, and will be understood by reading and studying the following specification.

OBJECTIVES OF THE EMBODIMENTS HEREIN

The primary object of the embodiments herein is to provide a method and a system for managing knowledge for solving vulnerability issues using an organizational knowl-edgebase.

Another object of the embodiments herein is to provide a method for managing Knowledge and documentation in a new way by focusing on a vulnerability management plat-form but is used in more situations.

Yet another object of the embodiments herein is to develop a method to create knowledge base to link vulner-abilities, tickets and code commits in an intelligent way, so that all the pieces are tied together and are available in a single place.

Yet another object of the embodiments herein is to develop a method to create a knowledge base to solve the challenge of keeping the document alive and current over time.

Yet another object of the embodiments herein is to create an approval workflow to publish articles, thereby ensuring the quality of an article, and also for controlling multiple articles mushrooming around the same topic and a rampant issue identified by security leaders.

Yet another object of the embodiments herein is to create a rich document to capture formatted text, attach images inline, include external links with inline previews, inline videos from YouTube etc., well formatted code, and good and bad examples.

Yet another object of the embodiments herein is to link KB articles to the core document in another system, and then to add the Code magic around it, when an organization already has a Knowledge Base in another system, for example, Confluence.

Yet another object of the embodiments herein is to tag CVEs or CWEs for an article when creating the article, or later when updating the article.

Yet another object of the embodiments herein is to pro-vide recommendation, to automatically suggest most rel-evant matching articles from its Knowledge Base to enable a person creating the ticket to choose or search for more articles in real time when a ticket is created for finding/list of findings.

Yet another object of the embodiments herein is to attach selected articles to a ticket tracking system as links to enable a developer to simply click on this link inside the ticket and land directly on an article in the created knowledge base.

Yet another object of the embodiments herein is to auto-matically attach the ticket, the included findings, CVEs from the findings to the created article so that, the article remains fresh over a time period, and maintains relevance as more findings are found and fixed in the system automatically, when an article is attached to a ticket.

Yet another object of the embodiments herein is to enable the user to link the code commit to the article when a ticket is fixed.

Yet another object of the embodiments herein is to provide artificial intelligence (AI) to automatically link code commits to the KB articles, and NLP and other context are employed to automatically link a code commit to ticket tracking system, or vulnerability or both.

Yet another object of the embodiment herein is to provide a runbook to automatically attach possible KB articles to a ticket, when tickets are created via runbook.

These and other objects and advantages of the present invention will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

The various embodiments herein provide a computer-implemented method and system for managing knowledge for solving vulnerability issues using an organizational knowledgebase. The method for managing knowledge for solving vulnerability issues using organizational knowledgebase is provided. The method comprises linking a vulnerability management platform knowledgebase (KB) article to an organization's core documents, such that linking the vulnerability management platform knowledgebase (KB) articles to an organization's core documents ensures that the information in the vulnerability management platform KB articles is grounded in authoritative and reliable sources, including policy documents, guidelines, or technical specifications of the organization's core documents. The method further comprises applying a vulnerability management platform formula to the linked vulnerability management platform knowledgebase (KB) articles and the organization's core documents, to enhance the knowledge management and security practices within the organization's knowledgebase. Further, the method for applying the vulnerability management platform formula is provided. The method comprises tagging common vulnerabilities and exposures (CVEs) or common weakness enumeration (CWEs), to the vulnerability platform knowledgebase (KB)

articles; attaching rich articles as links to a ticket tracking system; linking the vulnerability management platform KB articles to a new ticket created; and automatically linking a code commit to the vulnerability management platform KB articles. The method further comprises defining and configuring a plurality of Service Level Agreements (SLAs) at an application or sub-application level to set acceptable timelines for acknowledging and mitigating security concerns.

According to one embodiment herein, the vulnerability management platform knowledgebase (KB) articles are specific pieces of knowledge or documentation stored in a vulnerability management platform knowledgebase (KB) of a vulnerability management platform, created and maintained within the vulnerability management platform. The vulnerability management platform knowledgebase (KB) articles cover a wide range of topics, including security best practices, vulnerability explanations, mitigation strategies, and other relevant information. The vulnerability management platform knowledgebase (KB) is a centralized repository or database that houses a collection of articles, guides, documents, and information related to cybersecurity, software development, vulnerability management, and other relevant topics and serves as a comprehensive reference for the organization's security teams, developers, and other stakeholders. Furthermore, the vulnerability management platform KB articles owns a defined content and format and are typically well-structured and organized to facilitate easy access and understanding. They may include detailed explanations, step-by-step guides, code snippets, examples, and visual aids to enhance comprehension. In addition, the vulnerability management KB articles are regularly updated and maintained to keep the information current and aligned with the latest security trends, software updates, and industry developments. Hence the vulnerability management KB articles represent a critical component of the organization's knowledge management system, providing valuable insights into cybersecurity, vulnerabilities, and best practices, while being interconnected with core documents and supported by the capabilities of the vulnerability management platform.

According to one embodiment herein, the organization's core documents are authoritative references or foundational materials within the organization, serve as a primary source of information, and are crucial for providing context, guidance, and official knowledge. The core documents as the authoritative references serve as the primary source of information within the organization, and include official manuals, guidelines, policy documents, best practices, or standard operating procedures (SOPs) related to cybersecurity, software development, or any other relevant domain.

According to one embodiment herein, the vulnerability management platform formula includes a broader set of practices and functionalities that enhance the knowledge management and security practices within the organization and includes several key activities related to the vulnerability management platform KB articles and their integration with other systems.

According to one embodiment herein, the tagging of CVEs or CWEs involves categorizing the vulnerability management platform KB articles with standardized identifiers that represent specific vulnerabilities or weaknesses, and categorization allows the users to quickly find articles related to specific security issues. The process of tagging the CVEs or CWEs to the vulnerability management platform KB article is provided. The process comprises identifying relevant CVEs or CWEs that are applicable to the organization's systems, software, or infrastructure, and also conducting research on known vulnerabilities, weaknesses, or exposures that could potentially impact the organization's assets; reviewing the existing vulnerability management platform KB articles to identify the content that addresses or relates to the identified CVEs or CWEs, and if the existing vulnerability management platform KB articles does not cover all the identified vulnerabilities, add new vulnerability management platform KB articles as appropriate; tagging and linking the relevant CVEs or CWEs identified with corresponding vulnerability management KB articles, that are reviewed; establishing a standardized taxonomy or system of tagging that aligns with recognized CVE or CWE identifiers, to ensure consistency and facilitates easier retrieval of the information; and verifying that the tagging has been correctly applied to the appropriate articles and that the links are accurate, to ensure that the users can find the relevant information they need when searching for specific CVEs or CWEs.

According to one embodiment herein, the rich articles are vulnerability management platform KB articles that contain comprehensive and detailed information about specific security vulnerabilities, weaknesses, best practices, and other relevant cybersecurity-related topics, created and maintained within the vulnerability management platform knowledgebase. Attaching the rich articles as links to a ticket tracking system provides essential contextual information and guidance to stakeholders involved in resolving security-related tasks or issues. Furthermore, the ticket tracking system includes JIRA ticket, ServiceNow, GitLab, and/or Azure ticketing.

According to one embodiment herein, linking the vulnerability management platform KB articles to a new ticket created involves an intelligence auto-suggesting the vulnerability management platform KB articles to link to the new tickets created through the ticket tracking system, to provide context and relevant information to individuals working on the ticket, and ensuring that they have access to the necessary knowledge to address the issue effectively.

According to one embodiment herein, during automatically linking a code commit to the vulnerability management platform KB articles, the method employs natural language processing (NLP) and contextual analysis to automatically associate the code commit with the corresponding ticket, vulnerability, or both, based on the information contained in the vulnerability management KB article, to establish a connection between the code changes and relevant vulnerability management KB articles, to aid developers in understanding more contextual information while referencing the vulnerability management KB articles.

According to one embodiment herein, the plurality of SLAs includes first response SLA, resolution SLA, and developer SLA. The first response SLA provides an acceptable time limit within which the development and security teams should acknowledge the receipt of a security concern or finding. The resolution SLA defines the time limit for resolving or mitigating the identified security concern, and specifies the maximum time allowed for the development and security teams to implement a fix or apply appropriate security measures. The developer SLA specifically pertains to the developers' responsibilities in addressing security findings, and defines the time allocated to the development team for implementing security fixes.

According to one embodiment herein, each of the plurality of SLAs is associated with different priority levels, including Critical, High, Medium, and Low, corresponding to different severity levels of security findings/issues. Each of the plurality of SLAs is also provided with a time limit configuration, and global settings. The SLA configuration allows the user to define specific time limits (in days) for each priority level. For example, a Critical finding may have a First Response SLA of 1 day, while a Low finding may have a First Response SLA of 7 days. Similarly, the vulnerability management platform allows the definition of multiple SLAs in global settings. These global SLAs serve as templates that can be applied to various applications or sub-applications. Hence, by offering SLA configuration capabilities, the vulnerability management platform enables organizations to set clear expectations and establish time limits for acknowledging and resolving security concerns based on their severity levels. This helps ensure a systematic and prioritized approach to addressing security findings and maintaining a proactive security posture across different software entities managed within the platform.

According to one embodiment herein, the application in the vulnerability management platform is an abstract entity that represents a group of related software components, which are smaller software modules or services that work together to achieve a specific functionality or purpose. Correspondingly, the sub-applications are a micro-service which are smaller independent software components that are developed, tested, and deployed separately, and do not require the complete set of software that builds the overall application. While creating applications or sub-applications within the vulnerability management platform, users can select and configure specific SLAs that best suit the security requirements and priorities of each application or sub-application.

According to one embodiment herein, the method also provides a vulnerability management platform runbook to automatically link the vulnerability management platform KB articles to the ticket. The vulnerability management platform runbook is a set of predefined and automated workflows the users utilizes to create and customize, and streamline various tasks and processes related to application security. The vulnerability management platform runbook also enables automating repetitive actions, such as updating findings, creating tickets, sending email notifications, and integrating with communication tools including Slack. By leveraging runbook in the vulnerability management platform, organizations can significantly improve efficiency, reduce manual effort, and enhance consistency in their application security processes. Automation through Runbooks also ensures that security measures are applied consistently and promptly, helping organizations maintain a strong and proactive security posture for their software applications.

According to one embodiment herein, a computer-implemented system for managing knowledge for solving vulnerability issues using an organizational knowledgebase is provided. The system comprises a documentation module configured to link a vulnerability management platform knowledgebase (KB) article to an organization's core documents, and to ensure that the information in the vulnerability management platform KB articles is grounded in authoritative and reliable sources, including policy documents, guidelines, or technical specifications of the organization's core documents. The system further comprises a vulnerability management module configured to apply a vulnerability management platform formula to the linked vulnerability management platform knowledgebase (KB) articles and the organization's core documents of the documentation module, to enhance the knowledge management and security practices within the organization's knowledgebase. Further, the method for applying the vulnerability management platform formula by the vulnerability management module is provided. The method comprises tagging common vulnerabilities and exposures (CVEs) or common weakness enumeration (CWEs), to the vulnerability platform knowledgebase (KB) articles of the vulnerability management module; attaching rich articles as links to a ticket tracking system; linking the vulnerability management platform KB articles to a new ticket created; and automatically linking a code commit to the vulnerability management platform KB articles. The system further comprises an SLA configuration module configured to define and configure a plurality of Service Level Agreements (SLAs) at an application or sub-application level to set acceptable timelines for acknowledging and mitigating security concerns.

According to one embodiment herein, the vulnerability management platform knowledgebase (KB) articles are specific pieces of knowledge or documentation stored in a vulnerability management platform knowledgebase (KB) of a vulnerability management platform, created and maintained within the vulnerability management platform of the vulnerability management module. The vulnerability management platform knowledgebase (KB) articles cover a wide range of topics, including security best practices, vulnerability explanations, mitigation strategies, and other relevant information. The vulnerability management platform knowledgebase (KB) is a centralized repository or database that houses a collection of articles, guides, documents, and information related to cybersecurity, software development, vulnerability management, and other relevant topics and serves as a comprehensive reference for the organization's security teams, developers, and other stakeholders. Furthermore, the vulnerability management platform KB articles owns a defined content and format and are typically well-structured and organized to facilitate easy access and understanding. They may include detailed explanations, step-by-step guides, code snippets, examples, and visual aids to enhance comprehension. In addition, the vulnerability management KB articles are regularly updated and maintained to keep the information current and aligned with the latest security trends, software updates, and industry developments. Hence the vulnerability management KB articles represent a critical component of the organization's knowledge management system, providing valuable insights into cybersecurity, vulnerabilities, and best practices, while being interconnected with core documents and supported by the capabilities of the vulnerability management platform.

According to one embodiment herein, the organization's core documents of the documentation module are authoritative references or foundational materials within the organization, serve as a primary source of information, and are crucial for providing context, guidance, and official knowledge. The core documents as the authoritative references serve as the primary source of information within the organization, and include official manuals, guidelines, policy documents, best practices, or standard operating procedures (SOPs) related to cybersecurity, software development, or any other relevant domain.

According to one embodiment herein, the vulnerability management platform formula of the vulnerability management module includes a broader set of practices and functionalities that enhance the knowledge management and security practices within the organization and includes several key activities related to the vulnerability management platform KB articles and their integration with other systems.

According to one embodiment herein, the tagging of CVEs or CWEs involves categorizing the vulnerability management platform KB articles with standardized identifiers that represent specific vulnerabilities or weaknesses, and categorization allows the users to quickly find articles related to specific security issues. The process of tagging the CVEs or CWEs to the vulnerability management platform KB articles of the documentation module is provided. The process comprises identifying relevant CVEs or CWEs that are applicable to the organization's systems, software, or infrastructure, and also conducting research on known vulnerabilities, weaknesses, or exposures that could potentially impact the organization's assets; reviewing the existing vulnerability management platform KB articles to identify the content that addresses or relates to the identified CVEs or CWEs, and if the existing vulnerability management platform KB articles does not cover all the identified vulnerabilities, add new vulnerability management platform KB articles as appropriate; tagging and linking the relevant CVEs or CWEs identified with corresponding vulnerability management KB articles, that are reviewed; establishing a standardized taxonomy or system of tagging that aligns with recognized CVE or CWE identifiers, to ensure consistency and facilitates easier retrieval of the information; and verifying that the tagging has been correctly applied to the appropriate articles and that the links are accurate, to ensure that the users can find the relevant information they need when searching for specific CVEs or CWEs.

According to one embodiment herein, the rich articles are vulnerability management platform KB articles that contain comprehensive and detailed information about specific security vulnerabilities, weaknesses, best practices, and other relevant cybersecurity-related topics, created and maintained within the vulnerability management platform knowledgebase. Attaching the rich articles as links to a ticket tracking system provides essential contextual information and guidance to stakeholders involved in resolving security-related tasks or issues. Furthermore, the ticket tracking system includes JIRA ticket, ServiceNow, GitLab, and/or Azure ticketing.

According to one embodiment herein, linking the vulnerability management platform KB articles to a new ticket created in the vulnerability management module involves an intelligence auto-suggesting the vulnerability management platform KB articles to link to the new tickets created through the ticket tracking system, to provide context and relevant information to individuals working on the ticket, and ensuring that they have access to the necessary knowledge to address the issue effectively.

According to one embodiment herein, during automatically linking a code commit to the vulnerability management platform KB articles, the system employs natural language processing (NLP) and contextual analysis to automatically associate the code commit with the corresponding ticket, vulnerability, or both, based on the information contained in the vulnerability management KB article, to establish a connection between the code changes and relevant vulnerability management KB articles, to aid developers in understanding more contextual information while referencing the vulnerability management KB articles.

According to one embodiment herein, the plurality of SLAs defined and configured in the SLA configuration module includes first response SLA, resolution SLA, and developer SLA. The first response SLA provides an acceptable time limit within which the development and security teams should acknowledge the receipt of a security concern or finding. The resolution SLA defines the time limit for resolving or mitigating the identified security concern, and specifies the maximum time allowed for the development and security teams to implement a fix or apply appropriate security measures. The developer SLA specifically pertains to the developers' responsibilities in addressing security findings, and defines the time allocated to the development team for implementing security fixes.

According to one embodiment herein, each of the plurality of SLAs of the SLA configuration module is associated with different priority levels, including Critical, High, Medium, and Low, corresponding to different severity levels of security findings/issues. Each of the plurality of SLAs is also provided with a time limit configuration, and global settings. The SLA configuration allows the user to define specific time limits (in days) for each priority level. For example, a Critical finding may have a First Response SLA of 1 day, while a Low finding may have a First Response SLA of 7 days. Similarly, the vulnerability management platform allows the definition of multiple SLAs in global settings. These global SLAs serve as templates that can be applied to various applications or sub-applications. Hence, by offering SLA configuration capabilities, the vulnerability management platform enables organizations to set clear expectations and establish time limits for acknowledging and resolving security concerns based on their severity levels. This helps ensure a systematic and prioritized approach to addressing security findings and maintaining a proactive security posture across different software entities managed within the platform.

According to one embodiment herein, the application in the vulnerability management platform is an abstract entity that represents a group of related software components, which are smaller software modules or services that work together to achieve a specific functionality or purpose. Correspondingly, the sub-applications are a micro-service which are smaller independent software components that are developed, evaluated, and deployed separately, and do not require the complete set of software that builds the overall application. While creating applications or sub-applications within the vulnerability management platform, users can select and configure specific SLAs that best suit the security requirements and priorities of each application or sub-application.

According to one embodiment herein, the system also provides a vulnerability management platform runbook to automatically link the vulnerability management platform KB articles to the ticket. The vulnerability management platform runbook is a set of predefined and automated workflows the users utilizes to create and customize, and streamline various tasks and processes related to application security. The vulnerability management platform runbook also enables automating repetitive actions, such as updating findings, creating tickets, sending email notifications, and integrating with communication tools including Slack. By leveraging runbook in the vulnerability management platform, organizations can significantly improve efficiency, reduce manual effort, and enhance consistency in their application security processes. Automation through Runbooks also ensures that security measures are applied consistently and promptly, helping organizations maintain a strong and proactive security posture for their software applications.

The foregoing summary is illustrative only and is not intended to be in any way limiting. In addition to the illustrative aspects, embodiments, and features described above, further aspects, embodiments, and features will become apparent by reference to the drawings and the following detailed description.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 1 illustrates a flowchart depicting a method for managing knowledge for solving vulnerability issues using an organizational knowledgebase, according to one embodiment herein.

FIG. 3 depicts a user interface view illustrating the vulnerability management platform KB for the organization of articles, in accordance with an embodiment herein.

FIG. 5 depicts a user interface view illustrating rich articles with linked tickets, vulnerabilities and the like using the vulnerability management KB, in accordance with an embodiment herein.

FIG. 6 depicts a user interface view illustrating attaching KB article when creating a ticket using the vulnerability management platform KB, in accordance with an embodiment herein.

FIG. 7 depicts a user interface view illustrating linking code committed to an article using the vulnerability management KB, in accordance with an embodiment herein.

Figure 2:
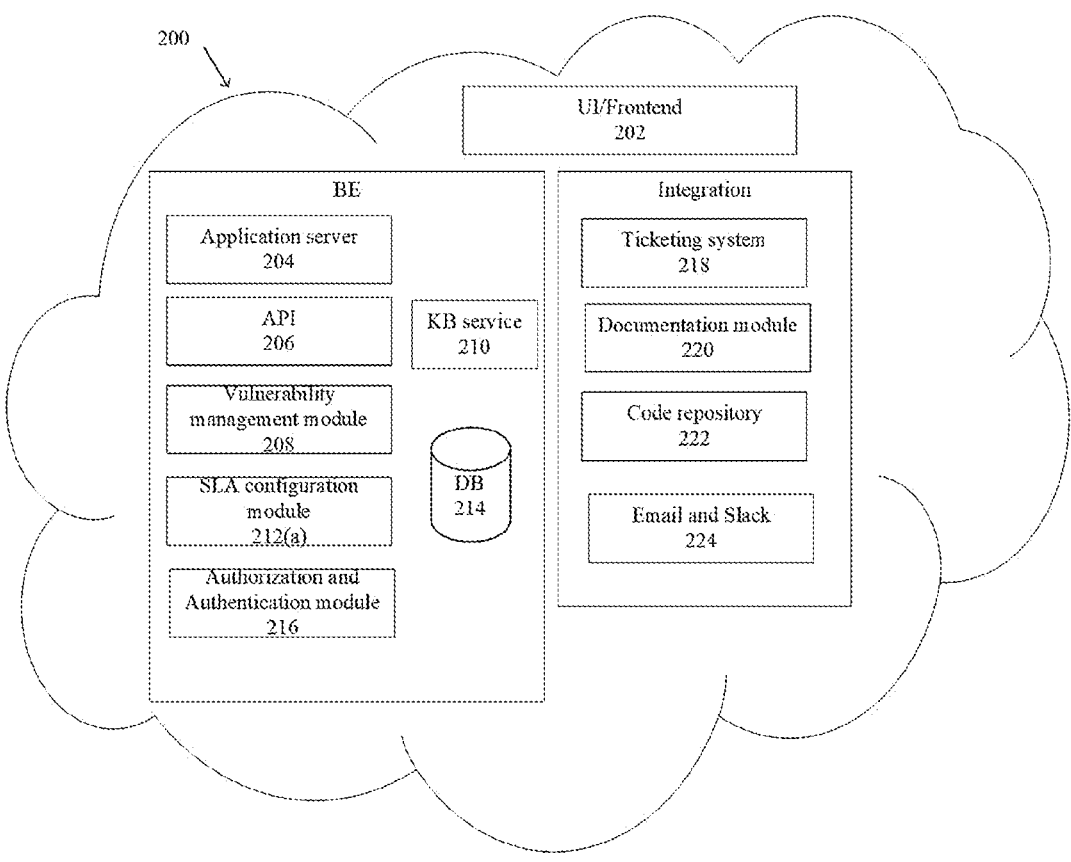
FIG. 2 depicts a computer-implemented system for managing knowledge for solving vulnerability issues using an organizational knowledgebase, according to one embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The various embodiments herein provide a computer-implemented method and system for managing knowledge for solving vulnerability issues using an organizational knowledgebase. The method for managing knowledge for solving vulnerability issues using organizational knowledgebase is provided. The method comprises linking a vulnerability management platform knowledgebase (KB) article to an organization's core documents, such that linking the vulnerability management platform knowledgebase (KB) articles to an organization's core documents ensures that the information in the vulnerability management platform KB articles is grounded in authoritative and reliable sources, including policy documents, guidelines, or technical specifications of the organization's core documents. The method further comprises applying a vulnerability management platform formula to the linked vulnerability management platform knowledgebase (KB) articles and the organization's core documents, to enhance the knowledge management and security practices within the organization's knowledgebase. Further, the method for applying the vulnerability management platform formula is provided. The method comprises tagging common vulnerabilities and exposures (CVEs) or common weakness enumeration (CWEs), to the vulnerability platform knowledgebase (KB) articles; attaching rich articles as links to a ticket tracking system; linking the vulnerability management platform KB articles to a new ticket created; and automatically linking a code commit to the vulnerability management platform KB articles. The method further comprises defining and configuring a plurality of Service Level Agreements (SLAs) at an application or sub-application level to set acceptable timelines for acknowledging and mitigating security concerns.

According to one embodiment herein, the vulnerability management platform knowledgebase (KB) articles are specific pieces of knowledge or documentation stored in a vulnerability management platform knowledgebase (KB) of a vulnerability management platform, created and maintained within the vulnerability management platform. The vulnerability management platform knowledgebase (KB) articles cover a wide range of topics, including security best practices, vulnerability explanations, mitigation strategies, and other relevant information. The vulnerability management platform knowledgebase (KB) is a centralized repository or database that houses a collection of articles, guides, documents, and information related to cybersecurity, software development, vulnerability management, and other relevant topics and serves as a comprehensive reference for the organization's security teams, developers, and other stakeholders. Furthermore, the vulnerability management platform KB articles owns a defined content and format and are typically well-structured and organized to facilitate easy access and understanding. They may include detailed explanations, step-by-step guides, code snippets, examples, and visual aids to enhance comprehension. In addition, the vulnerability management KB articles are regularly updated and maintained to keep the information current and aligned with the latest security trends, software updates, and industry developments. Hence the vulnerability management KB articles represent a critical component of the organization's knowledge management system, providing valuable insights into cybersecurity, vulnerabilities, and best practices, while being interconnected with core documents and supported by the capabilities of the vulnerability management platform.

According to one embodiment herein, the organization's core documents are authoritative references or foundational materials within the organization, serve as a primary source of information, and are crucial for providing context, guidance, and official knowledge. The core documents as the authoritative references serve as the primary source of information within the organization, and include official manuals, guidelines, policy documents, best practices, or standard operating procedures (SOPs) related to cybersecurity, software development, or any other relevant domain.

Furthermore, the core documents may consist of technical specifications that outline the architecture, design principles, and implementation details of the organization's products or services. These specifications provide crucial insights into the organization's technology stack and how different components interact. Also, depending on the organization's industry and scope of operations, core documents could also encompass regulatory and compliance materials. These documents ensure that the organization adheres to industry standards, legal requirements, and data protection regulations. For software development organizations, core documents may include design and architecture documents that describe how software systems are structured, their functionalities and the rationale behind specific design choices. In addition, the core documents may contain incident response plans that detail how the organization manages security breaches, cyberattacks, or other emergencies. These plans help ensure a swift and coordinated response to potential threats.

Moreover, the core documents might comprise training manuals or knowledge repositories used to educate employees about the organization's practices, security protocols, and standard procedures. These materials contribute to workforce skill development and awareness. In certain cases, core documents could consist of research papers or whitepapers authored by the organization's experts. These documents contribute valuable insights into emerging technologies, security trends, or industry developments. Furthermore, for organizations involved in software development or manufacturing, core documents might contain quality control and testing procedures. These documents ensure that products meet stringent quality standards before deployment. Hence, the core documents serve as the backbone of an organization's knowledge repository, offering reliable and authoritative information that should be linked to the vulnerability management platform KB articles to provide a comprehensive and well-rounded knowledge management system.

According to one embodiment herein, the vulnerability management platform formula includes a broader set of practices and functionalities that enhance the knowledge management and security practices within the organization and includes several key activities related to the vulnerability management platform KB articles and their integration with other systems.

According to one embodiment herein, the tagging of CVEs or CWEs involves categorizing the vulnerability management platform KB articles with standardized identifiers that represent specific vulnerabilities or weaknesses, and categorization allows the users to quickly find articles related to specific security issues. The process of tagging the CVEs or CWEs to the vulnerability management platform KB article is provided. The process comprises identifying relevant CVEs or CWEs that are applicable to the organization's systems, software, or infrastructure, and also conducting research on known vulnerabilities, weaknesses, or exposures that could potentially impact the organization's assets; reviewing the existing vulnerability management platform KB articles to identify the content that addresses or relates to the identified CVEs or CWEs, and if the existing vulnerability management platform KB articles does not cover all the identified vulnerabilities, add new vulnerability management platform KB articles as appropriate; tagging and linking the relevant CVEs or CWEs identified with corresponding vulnerability management KB articles, that are reviewed; establishing a standardized taxonomy or system of tagging that aligns with recognized CVE or CWE identifiers, to ensure consistency and facilitates easier retrieval of the information; and verifying that the tagging has been correctly applied to the appropriate articles and that the links are accurate, to ensure that the users can find the relevant information they need when searching for specific CVEs or CWEs.

Furthermore, the purpose of tagging CVEs or CWEs to the vulnerability management platform KB articles has numerous advantages. By tagging CVEs or CWEs to the vulnerability management platform KB articles, the Knowledge Base becomes better organized and categorized. This makes it easier for users to locate information related to specific vulnerabilities or weaknesses, streamlining knowledge retrieval. In addition, while creating tickets for the vulnerabilities, the vulnerability management platform suggests the appropriate set of KB articles that will be helpful to resolve and mitigate those vulnerabilities based on the linked CVEs and CWEs. In the event of an incident related to a known vulnerability or weakness, security teams can quickly refer to tagged articles to gather relevant information for timely and effective incident response. This helps faster resolution of tickets, fixes, and mitigation of vulnerabilities. Also, the tagged articles provide a centralized repository of information on known vulnerabilities and weaknesses. This aids security teams in managing these issues effectively and implementing appropriate mitigation measures.

Moreover, the security teams can prioritize their efforts based on the severity and impact of CVEs or CWEs. They can focus on addressing the most critical issues first to enhance overall security posture. The tagging CVEs or CWEs demonstrates an organization's awareness of potential security risks and its proactive approach to addressing them. This information can be valuable for compliance reporting and audits. In addition, regularly updating the tags as new CVEs or CWEs are discovered allows the organization to stay informed about the evolving threat landscape and adapt its security practices accordingly. Therefore, the tagging CVEs or CWEs to the vulnerability management KB articles is a valuable practice for effective knowledge organization, improved vulnerability management, incident response support, and maintaining a strong cybersecurity posture within the organization.

According to one embodiment herein, the rich articles are vulnerability management platform KB articles that contain comprehensive and detailed information about specific security vulnerabilities, weaknesses, best practices, and other relevant cybersecurity-related topics, created and maintained within the vulnerability management platform knowledgebase. Attaching the rich articles as links to a ticket tracking system provides essential contextual information and guidance to stakeholders involved in resolving security-related tasks or issues. Furthermore, the ticket tracking system includes JIRA ticket, ServiceNow, GitLab, and/or Azure ticketing.

Moreover, the rich articles are comprehensive, well-researched, and contain in-depth information about the security topic they address. They may include detailed explanations, step-by-step guides, code examples, diagrams, and other relevant visual aids. These articles often provide practical guidance on how to address and mitigate specific vulnerabilities or weaknesses. They may outline recommended security measures and best practices to prevent potential exploitation. In addition, the content in rich articles is regularly reviewed and updated to ensure that it reflects the latest security trends, software updates, and industry developments.

Furthermore, by attaching rich articles to the ticket tracking system, such as JIRA tickets, the developers and other stakeholders can quickly access relevant and comprehensive information related to the security issue at hand. This enables them to make informed decisions and implement appropriate fixes more efficiently. The rich articles also provide contextual information about the security vulnerabilities or weaknesses associated with the ticket tracking system. This empowers stakeholders to understand the severity and potential impact of the issue and take appropriate actions accordingly. Furthermore, the rich articles offer practical guidance and best practices to address security concerns. This ensures that the resolution process follows industry-standard security measures and helps prevent similar issues in the future.

Moreover, by linking the rich articles within the vulnerability management KB, the organization ensures that all stakeholders have access to consistent and accurate information. This avoids misinformation or confusion during issue resolution. Also, the rich articles attached to the ticket tracking system can also serve as a means of security awareness and training for developers and other team members. Reading the articles can educate them about potential security pitfalls and ways to write more secure code. Furthermore, attaching rich articles promotes collaboration between development and security teams. It creates a shared knowledge base that facilitates cross-team communication and a collective effort to improve security practices. Therefore, attaching rich articles from the vulnerability management platform Knowledge Base to the ticket tracking system provides valuable contextual information, guidance, and best practices during issue resolution. It also empowers stakeholders to make informed decisions, ensures consistent and accurate information dissemination, and fosters collaboration and security awareness within the organization.

According to one embodiment herein, linking the vulnerability management platform KB articles to a new ticket created involves an intelligence auto-suggesting the vulnerability management platform KB articles to link to the new tickets created through the ticket tracking system, to provide context and relevant information to individuals working on the ticket, and ensuring that they have access to the necessary knowledge to address the issue effectively.

According to one embodiment herein, during automatically linking a code commit to the vulnerability management platform KB articles, the method employs natural language processing (NLP) and contextual analysis to automatically associate the code commit with the corresponding ticket, vulnerability, or both, based on the information contained in the vulnerability management KB article, to establish a connection between the code changes and relevant vulnerability management KB articles, to aid developers in understanding more contextual information while referencing the vulnerability management KB articles.

Therefore, the purpose of integrating the vulnerability management platform formula, practices, and functionalities into the vulnerability management platform is to foster better collaboration between security, development, and incident response teams. By linking security-related knowledge directly to tickets and code commits, the organization can improve incident response capabilities by providing relevant security information within the ticket tracking system, enabling teams to address security issues efficiently; enhance developers' awareness of potential vulnerabilities or weaknesses while reviewing and committing code changes; and facilitate a seamless flow of information between different teams, ensuring that security knowledge is readily available wherever it is needed. Hence, the vulnerability management platform formula contributes to a more robust and comprehensive approach to cybersecurity, knowledge management, and collaboration within the organization.

According to one embodiment herein, the plurality of SLAs includes first response SLA, resolution SLA, and developer SLA. The first response SLA provides an acceptable time limit within which the development and security teams should acknowledge the receipt of a security concern or finding. The resolution SLA defines the time limit for resolving or mitigating the identified security concern, and specifies the maximum time allowed for the development and security teams to implement a fix or apply appropriate security measures. The developer SLA specifically pertains to the developers' responsibilities in addressing security findings, and defines the time allocated to the development team for implementing security fixes.

According to one embodiment herein, each of the plurality of SLAs is associated with different priority levels, including Critical, High, Medium, and Low, corresponding to different severity levels of security findings/issues. Each of the plurality of SLAs is also provided with a time limit configuration, and global settings. The SLA configuration allows the user to define specific time limits (in days) for each priority level. For example, a Critical finding may have a First Response SLA of 1 day, while a Low finding may have a First Response SLA of 7 days. Similarly, the vulnerability management platform allows the definition of multiple SLAs in global settings. These global SLAs serve as templates that can be applied to various applications or sub-applications. Hence, by offering SLA configuration capabilities, the vulnerability management platform enables organizations to set clear expectations and establish time limits for acknowledging and resolving security concerns based on their severity levels. This helps ensure a systematic and prioritized approach to addressing security findings and maintaining a proactive security posture across different software entities managed within the platform.

According to one embodiment herein, the application in the vulnerability management platform is an abstract entity that represents a group of related software components, which are smaller software modules or services that work together to achieve a specific functionality or purpose. Correspondingly, the sub-applications are a micro-service which are smaller independent software components that are developed, tested, and deployed separately, and do not require the complete set of software that builds the overall application. While creating applications or sub-applications within the vulnerability management platform, users can select and configure specific SLAs that best suit the security requirements and priorities of each application or sub-application.

According to one embodiment herein, the method also provides a vulnerability management platform runbook to automatically link the vulnerability management platform KB articles to the ticket. The vulnerability management platform runbook is a set of predefined and automated workflows the users utilizes to create and customize, and streamline various tasks and processes related to application security. The vulnerability management platform runbook also enables automating repetitive actions, such as updating findings, creating tickets, sending email notifications, and integrating with communication tools including Slack. By leveraging runbook in the vulnerability management platform, organizations can significantly improve efficiency, reduce manual effort, and enhance consistency in their application security processes. Automation through Runbooks also ensures that security measures are applied consistently and promptly, helping organizations maintain a strong and proactive security posture for their software applications.

According to one embodiment herein, a computer-implemented system for managing knowledge for solving vulnerability issues using an organizational knowledgebase is provided. The system comprises a documentation module configured to link a vulnerability management platform knowledgebase (KB) article to an organization's core documents, and to ensure that the information in the vulnerability management platform KB articles is grounded in authoritative and reliable sources, including policy documents, guidelines, or technical specifications of the organization's core documents. The system further comprises a vulnerability management module configured to apply a vulnerability management platform formula to the linked vulnerability management platform knowledgebase (KB) articles and the organization's core documents of the documentation module, to enhance the knowledge management and security practices within the organization's knowledgebase. Further, the method for applying the vulnerability management platform formula by the vulnerability management module is provided. The method comprises tagging common vulnerabilities and exposures (CVEs) or common weakness enumeration (CWEs), to the vulnerability platform knowledgebase (KB) articles of the vulnerability management module; attaching rich articles as links to a ticket tracking system; linking the vulnerability management platform KB articles to a new ticket created; and automatically linking a code commit to the vulnerability management platform KB articles. The system further comprises an SLA configuration module configured to define and configure a plurality of Service Level Agreements (SLAs) at an application or sub-application level to set acceptable timelines for acknowledging and mitigating security concerns.

According to one embodiment herein, the vulnerability management platform knowledgebase (KB) articles are specific pieces of knowledge or documentation stored in a vulnerability management platform knowledgebase (KB) of a vulnerability management platform, created and maintained within the vulnerability management platform of the vulnerability management module. The vulnerability management platform knowledgebase (KB) articles cover a wide range of topics, including security best practices, vulnerability explanations, mitigation strategies, and other relevant information. The vulnerability management platform knowledgebase (KB) is a centralized repository or database that houses a collection of articles, guides, documents, and information related to cybersecurity, software development, vulnerability management, and other relevant topics and serves as a comprehensive reference for the organization's security teams, developers, and other stakeholders. Furthermore, the vulnerability management platform KB articles owns a defined content and format and are typically well-structured and organized to facilitate easy access and understanding. They may include detailed explanations, step-by-step guides, code snippets, examples, and visual aids to enhance comprehension. In addition, the vulnerability management KB articles are regularly updated and maintained to keep the information current and aligned with the latest security trends, software updates, and industry developments. Hence the vulnerability management KB articles represent a critical component of the organization's knowledge management system, providing valuable insights into cybersecurity, vulnerabilities, and best practices, while being interconnected with core documents and supported by the capabilities of the vulnerability management platform.

According to one embodiment herein, the organization's core documents of the documentation module are authoritative references or foundational materials within the organization, serve as a primary source of information, and are crucial for providing context, guidance, and official knowledge. The core documents as the authoritative references serve as the primary source of information within the organization, and include official manuals, guidelines, policy documents, best practices, or standard operating procedures (SOPs) related to cybersecurity, software development, or any other relevant domain.

Furthermore, the core documents may consist of technical specifications that outline the architecture, design principles, and implementation details of the organization's products or services. These specifications provide crucial insights into the organization's technology stack and how different components interact. Also, depending on the organization's industry and scope of operations, core documents could also encompass regulatory and compliance materials. These documents ensure that the organization adheres to industry standards, legal requirements, and data protection regulations. For software development organizations, core documents may include design and architecture documents that describe how software systems are structured, their functionalities and the rationale behind specific design choices. In addition, the core documents may contain incident response plans that detail how the organization manages security breaches, cyberattacks, or other emergencies. These plans help ensure a swift and coordinated response to potential threats.

Moreover, the core documents might comprise training manuals or knowledge repositories used to educate employees about the organization's practices, security protocols, and standard procedures. These materials contribute to workforce skill development and awareness. In certain cases, core documents could consist of research papers or whitepapers authored by the organization's experts. These documents contribute valuable insights into emerging technologies, security trends, or industry developments. Furthermore, for organizations involved in software development or manufacturing, core documents might contain quality control and testing procedures. These documents ensure that products meet stringent quality standards before deployment. Hence, the core documents serve as the backbone of an organization's knowledge repository, offering reliable and authoritative information that should be linked to the vulnerability management platform KB articles to provide a comprehensive and well-rounded knowledge management system.

According to one embodiment herein, the vulnerability management platform formula of the vulnerability management module includes a broader set of practices and functionalities that enhance the knowledge management and security practices within the organization and includes several key activities related to the vulnerability management platform KB articles and their integration with other systems.

According to one embodiment herein, the tagging of CVEs or CWEs involves categorizing the vulnerability management platform KB articles with standardized identifiers that represent specific vulnerabilities or weaknesses, and categorization allows the users to quickly find articles related to specific security issues. The process of tagging the CVEs or CWEs to the vulnerability management platform KB articles of the documentation module is provided. The process comprises identifying relevant CVEs or CWEs that are applicable to the organization's systems, software, or infrastructure, and also conducting research on known vulnerabilities, weaknesses, or exposures that could potentially impact the organization's assets; reviewing the existing vulnerability management platform KB articles to identify the content that addresses or relates to the identified CVEs or CWEs, and if the existing vulnerability management platform KB articles does not cover all the identified vulnerabilities, add new vulnerability management platform KB articles as appropriate; tagging and linking the relevant CVEs or CWEs identified with corresponding vulnerability management KB articles, that are reviewed; establishing a standardized taxonomy or system of tagging that aligns with recognized CVE or CWE identifiers, to ensure consistency and facilitates easier retrieval of the information; and verifying that the tagging has been correctly applied to the appropriate articles and that the links are accurate, to ensure that the users can find the relevant information they need when searching for specific CVEs or CWEs.

Furthermore, the purpose of tagging CVEs or CWEs to the vulnerability management platform KB articles has numerous advantages. By tagging CVEs or CWEs to the vulnerability management platform KB articles, the Knowledge Base becomes better organized and categorized. This makes it easier for users to locate information related to specific vulnerabilities or weaknesses, streamlining knowledge retrieval. In addition, while creating tickets for the vulnerabilities, the vulnerability management platform suggests the appropriate set of KB articles that will be helpful to resolve and mitigate those vulnerabilities based on the linked CVEs and CWEs. In the event of an incident related to a known vulnerability or weakness, security teams can quickly refer to tagged articles to gather relevant information for timely and effective incident response. This helps faster resolution of tickets, fixes, and mitigation of vulnerabilities. Also, the tagged articles provide a centralized repository of information on known vulnerabilities and weaknesses. This aids security teams in managing these issues effectively and implementing appropriate mitigation measures.

Moreover, the security teams can prioritize their efforts based on the severity and impact of CVEs or CWEs. They can focus on addressing the most critical issues first to enhance overall security posture. The tagging CVEs or CWEs demonstrates an organization's awareness of potential security risks and its proactive approach to addressing them. This information can be valuable for compliance reporting and audits. In addition, regularly updating the tags as new CVEs or CWEs are discovered allows the organization to stay informed about the evolving threat landscape and adapt its security practices accordingly. Therefore, the tagging CVEs or CWEs to the vulnerability management KB articles is a valuable practice for effective knowledge organization, improved vulnerability management, incident response support, and maintaining a strong cybersecurity posture within the organization.

According to one embodiment herein, the rich articles are vulnerability management platform KB articles that contain comprehensive and detailed information about specific security vulnerabilities, weaknesses, best practices, and other relevant cybersecurity-related topics, created and maintained within the vulnerability management platform knowledgebase. Attaching the rich articles as links to a ticket tracking system provides essential contextual information and guidance to stakeholders involved in resolving security-related tasks or issues. Furthermore, the ticket tracking system includes JIRA ticket, ServiceNow, GitLab, and/or Azure ticketing.

Moreover, the rich articles are comprehensive, well-researched, and contain in-depth information about the security topic they address. They may include detailed explanations, step-by-step guides, code examples, diagrams, and other relevant visual aids. These articles often provide practical guidance on how to address and mitigate specific vulnerabilities or weaknesses. They may outline recommended security measures and best practices to prevent potential exploitation. In addition, the content in rich articles is regularly reviewed and updated to ensure that it reflects the latest security trends, software updates, and industry developments.

Furthermore, by attaching rich articles to the ticket tracking system, such as JIRA tickets, the developers and other stakeholders can quickly access relevant and comprehensive information related to the security issue at hand. This enables them to make informed decisions and implement appropriate fixes more efficiently. The rich articles also provide contextual information about the security vulnerabilities or weaknesses associated with the ticket tracking system. This empowers stakeholders to understand the severity and potential impact of the issue and take appropriate actions accordingly. Furthermore, the rich articles offer practical guidance and best practices to address security concerns. This ensures that the resolution process follows industry-standard security measures and helps prevent similar issues in the future.

Moreover, by linking the rich articles within the vulnerability management KB, the organization ensures that all stakeholders have access to consistent and accurate information. This avoids misinformation or confusion during issue resolution. Also, the rich articles attached to the ticket tracking system can also serve as a means of security awareness and training for developers and other team members. Reading the articles can educate them about potential security pitfalls and ways to write more secure code. Furthermore, attaching rich articles promotes collaboration between development and security teams. It creates a shared knowledge base that facilitates cross-team communication and a collective effort to improve security practices. Therefore, attaching rich articles from the vulnerability management platform Knowledge Base to the ticket tracking system provides valuable contextual information, guidance, and best practices during issue resolution. It also empowers stakeholders to make informed decisions, ensures consistent and accurate information dissemination, and fosters collaboration and security awareness within the organization.

According to one embodiment herein, linking the vulnerability management platform KB articles to a new ticket created in the vulnerability management module involves an intelligence auto-suggesting the vulnerability management platform KB articles to link to the new tickets created through the ticket tracking system, to provide context and relevant information to individuals working on the ticket, and ensuring that they have access to the necessary knowledge to address the issue effectively.

According to one embodiment herein, during automatically linking a code commit to the vulnerability management platform KB articles, the system employs natural language processing (NLP) and contextual analysis to automatically associate the code commit with the corresponding ticket, vulnerability, or both, based on the information contained in the vulnerability management KB article, to establish a connection between the code changes and relevant vulnerability management KB articles, to aid developers in understanding more contextual information while referencing the vulnerability management KB articles.

Therefore, the purpose of integrating the vulnerability management platform formula, practices, and functionalities into the vulnerability management platform is to foster better collaboration between security, development, and incident response teams. By linking security-related knowledge directly to tickets and code commits, the organization can improve incident response capabilities by providing relevant security information within the ticket tracking system, enabling teams to address security issues efficiently; enhance developers' awareness of potential vulnerabilities or weaknesses while reviewing and committing code changes; and facilitate a seamless flow of information between different teams, ensuring that security knowledge is readily available wherever it is needed. Hence, the vulnerability management platform formula contributes to a more robust and comprehensive approach to cybersecurity, knowledge management, and collaboration within the organization.

According to one embodiment herein, the plurality of SLAs defined and configured in the SLA configuration module includes first response SLA, resolution SLA, and developer SLA. The first response SLA provides an acceptable time limit within which the development and security teams should acknowledge the receipt of a security concern or finding. The resolution SLA defines the time limit for resolving or mitigating the identified security concern, and specifies the maximum time allowed for the development and security teams to implement a fix or apply appropriate security measures. The developer SLA specifically pertains to the developers' responsibilities in addressing security findings, and defines the time allocated to the development team for implementing security fixes.

According to one embodiment herein, each of the plurality of SLAs of the SLA configuration module is associated with different priority levels, including Critical, High, Medium, and Low, corresponding to different severity levels of security findings/issues. Each of the plurality of SLAs is also provided with a time limit configuration, and global settings. The SLA configuration allows the user to define specific time limits (in days) for each priority level. For example, a Critical finding may have a First Response SLA of 1 day, while a Low finding may have a First Response SLA of 7 days. Similarly, the vulnerability management platform allows the definition of multiple SLAs in global settings. These global SLAs serve as templates that can be applied to various applications or sub-applications. Hence, by offering SLA configuration capabilities, the vulnerability management platform enables organizations to set clear expectations and establish time limits for acknowledging and resolving security concerns based on their severity levels. This helps ensure a systematic and prioritized approach to addressing security findings and maintaining a proactive security posture across different software entities managed within the platform.

According to one embodiment herein, the application in the vulnerability management platform is an abstract entity that represents a group of related software components, which are smaller software modules or services that work together to achieve a specific functionality or purpose. Correspondingly, the sub-applications are a micro-service which are smaller independent software components that are developed, tested, and deployed separately, and do not require the complete set of software that builds the overall application. While creating applications or sub-applications within the vulnerability management platform, users can select and configure specific SLAs that best suit the security requirements and priorities of each application or sub-application.

According to one embodiment herein, the system also provides a vulnerability management platform runbook to automatically link the vulnerability management platform KB articles to the ticket. The vulnerability management platform runbook is a set of predefined and automated workflows the users utilizes to create and customize, and streamline various tasks and processes related to application security. The vulnerability management platform runbook also enables automating repetitive actions, such as updating findings, creating tickets, sending email notifications, and integrating with communication tools including Slack. By leveraging runbook in the vulnerability management platform, organizations can significantly improve efficiency, reduce manual effort, and enhance consistency in their application security processes. Automation through Runbooks also ensures that security measures are applied consistently and promptly, helping organizations maintain a strong and proactive security posture for their software applications.

FIG. 1 illustrates a flowchart depicting a method for managing knowledge for solving vulnerability issues using an organizational knowledgebase, according to one embodiment herein. The method 100 comprises linking a vulnerability management platform knowledgebase (KB) articles to an organization's core documents at step 102, such that linking the vulnerability management platform knowledgebase (KB) articles to an organization's core documents ensures that the information in the vulnerability management platform KB articles is grounded in authoritative and reliable sources, including policy documents, guidelines, or technical specifications of the organization's core documents. The method 100 further comprises applying a vulnerability management platform formula to the linked vulnerability management platform knowledgebase (KB) articles and the organization's core documents, to enhance the knowledge management and security practices within the organization's knowledgebase at step 104. Further, the method for applying the vulnerability management platform formula is provided. The method comprises tagging common vulnerabilities and exposures (CVEs) or common weakness enumeration (CWEs), to the vulnerability platform knowledgebase (KB) articles at step 106; attaching rich articles as links to a ticket tracking system at step 108; linking the vulnerability management platform KB articles to a new ticket created at step 110; and automatically linking a code commit to the vulnerability management platform KB articles at step 112. The method 100 further comprises defining and configuring a plurality of Service Level Agreements (SLAs) at an application or sub-application level to set acceptable timelines for acknowledging and mitigating security concerns at step 114.

FIG. 2 depicts a computer-implemented system for managing knowledge for solving vulnerability issues using an organizational knowledgebase, according to one embodiment herein. The system 200 comprises front-end components consisting of a user interface 202 through which users interact with the vulnerability management platform. The vulnerability management platform includes web pages, dashboards, and visual elements that allow users to view, analyze, and manage security-related data. Further, the system 200 comprises backend components including an application server 204, an API layer 206, a vulnerability management module 208, knowledgebase (KB) service 210, workflow management 212, database 214, and authentication and authorization 216. The application server 204 is the core component of the backend that handles user requests, business logic, and data processing. The application server acts as an intermediary between the frontend and the various backend services. The API layer 206 exposes endpoints that allow the frontend and external systems to communicate with the backend. APIs facilitate data exchange and perform various actions such as querying vulnerability information, triggering scans, and retrieving KB articles. Furthermore, the vulnerability management module 208 is configured to apply a vulnerability management platform formula to the linked vulnerability management platform knowledgebase (KB) articles and the organization's core documents, to enhance the knowledge management and security practices within the organization's knowledgebase. Further, the method for applying the vulnerability management platform formula by the vulnerability management module is provided. The method comprises tagging common vulnerabilities and exposures (CVEs) or common weakness enumeration (CWEs), to the vulnerability platform knowledgebase (KB) articles of the vulnerability management module 208; attaching rich articles as links to a ticket tracking system; linking the vulnerability management platform KB articles to a new ticket created; and automatically linking a code commit to the vulnerability management platform KB articles. Furthermore, the vulnerability management module also comprises a vulnerability scan parser and collector responsible for connecting, collecting, and parsing the vulnerability scan reports from various tools that identify security vulnerabilities and weaknesses. The vulnerability scan parser and collector also interacts with third party tools that discover potential security risks. In addition, the knowledgebase service 210 manages the knowledgebase, which serves as a centralized repository for security-related information, best practices, and solutions. The KB service 210 also handles content organization, versioning, and metadata for the articles. Furthermore, the workflow management 212 is configured to handle Runbooks, SLAs, and other automation processes. The workflow management 212 enables users to define custom workflows, automates tasks, and manages approval workflows for publishing articles. The workflow management also comprises an SLA configuration module 212a configured to define and configure a plurality of Service Level Agreements (SLAs) at an application or sub-application level to set acceptable timelines for acknowledging and mitigating security concerns. The database 214 is configured to store various types of data, such as user information, vulnerability details, KB articles, and historical data related to scans and findings. In addition, authentication and authorization 216 is configured to manage user authentication and access control, ensuring that only authorized users can access specific functionalities and data. The system 200 further comprises integration components, such as ticketing system integration 218, a documentation module 220, code repository integration 222, and email and slack integration 224. The ticketing system integration 218 is integrated into the vulnerability management platform. The ticketing system includes JIRA, ServiceNow, which automatically create and update tickets for identified vulnerabilities. This integration streamlines the incident management process. Further, the documentation module 220 is configured to link a vulnerability management platform knowledgebase (KB) article to an organization's core documents, and to ensure that the information in the vulnerability management platform KB articles is grounded in authoritative and reliable sources, including policy documents, guidelines, or technical specifications of the organization's core documents. In addition, the code repository integration 222 is integrated with code repositories such as Git, SVN, allowing the platform to link code commits to relevant vulnerabilities and KB articles, providing contextual information for developers. Furthermore, the email and slack integration 224 is integrated with email and communication platforms such as slack, enabling the platform to send notifications and alerts to the users and teams. Furthermore, the system 200 is deployed on cloud infrastructure like AWS to ensure scalability and flexibility. Security measures, such as encryption, firewalls, and intrusion detection, are implemented to safeguard the platform from potential threats. Monitoring tools are used to track system health, performance, and security incidents.

FIG. 3 depicts a user interface view illustrating the vulnerability management platform KB for organization of articles, in accordance with an embodiment herein. If an organization already has a Knowledgebase in another system, for example, Confluence, the vulnerability management platform KB articles can link to the core document, and then add the vulnerability management platform formula around it.

Figure 4:
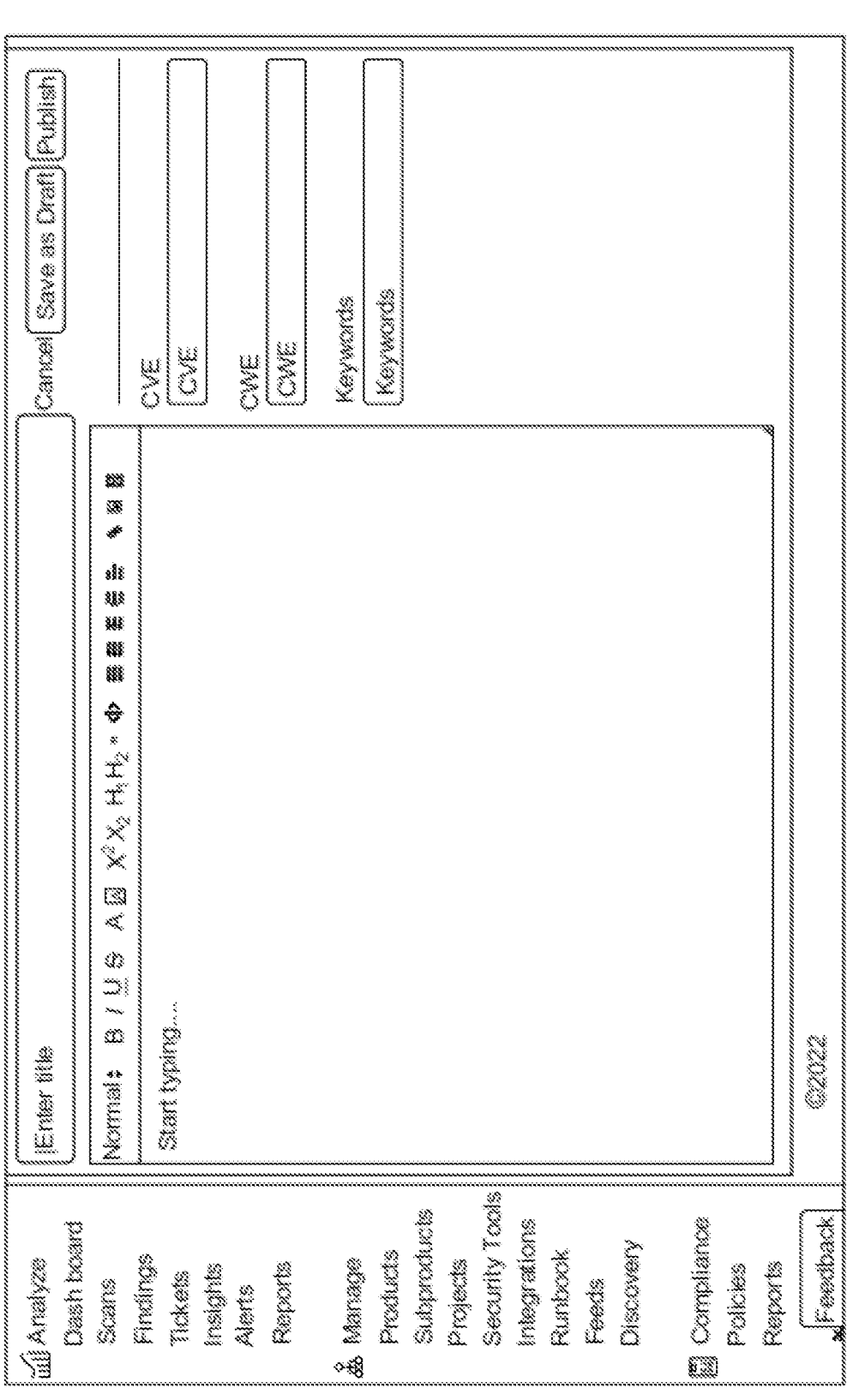
FIG. 4 depicts a user interface view for creating a new article using the vulnerability management platform KB, in accordance with an embodiment herein.

FIG. 4 depicts a user interface view for creating a new article using the vulnerability management platform KB, in accordance with an embodiment herein. When creating the article, or later when updating the article, common vulnerabilities, and exposures (CVEs) or common weakness enumeration (CWEs) can be tagged for that article. When creating a ticket for finding/list of findings, the vulnerability management platform automatically suggests the most relevant matching articles from its Knowledge Base. The person creating the ticket can choose or search for more articles in real-time.

FIG. 5 depicts a user interface view illustrating rich articles with linked tickets, vulnerabilities and the like using the vulnerability management KB, in accordance with an embodiment herein. One can create a rich document to capture formatted text, attach images inline, include external links with inline previews, inline videos from YouTube and the like, well formatted code good and bad examples. The selected articles get attached to JIRA tickets (or any other ticketing system) as links. A developer can simply click on this link inside the ticket and land directly on the vulnerability management platform article.

Figure 6:
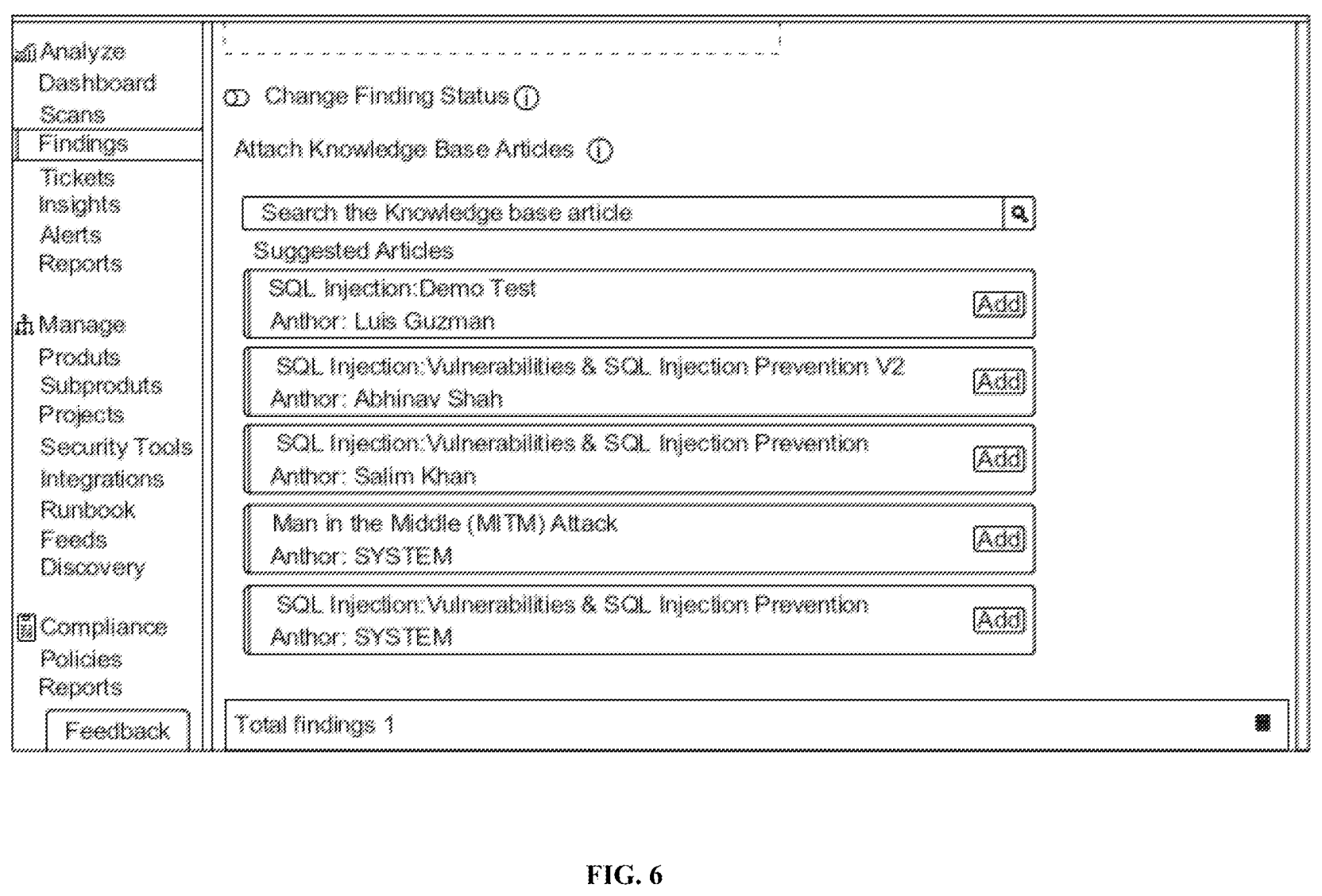

FIG. 6 depicts user interface view illustrating attaching KB article when creating a ticket using the vulnerability management platform KB, in accordance with an embodiment herein. When an article is attached to a ticket, the system automatically attaches the ticket, the included findings, CVEs from the findings to the article. So, over time, the article remains fresh, and maintains relevance as more findings are found and fixed in the system automatically. The above linkage feeds into the recommendations (in #4) so recommendations also keep getting better over time.

FIG. 7 depicts a user interface view illustrating linking code committed to an article using the vulnerability management KB, in accordance with an embodiment herein. When a ticket is fixed, a user can link the code commit to the article. The AI is used to automatically link code commits to the KB article. Basically, the vulnerability management platform looks at each commit as it happens and employs NLP and other context to automatically link a code commit to JIRA ticket, or vulnerability, or both.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail above. It should be understood, however, that it is not intended to limit the disclosure to the forms disclosed, but on the contrary, the disclosure is to cover all modifications, equivalents, and alternatives falling within the scope of the disclosure.

The embodiments herein disclose a computer-implemented system and method for managing knowledge for solving vulnerability issues using an organizational knowledgebase. The embodiments herein provide several advantages in addressing application security challenges and improving the overall security posture of organizations. The advantages include reduced vulnerability exposure time, by intelligently linking vulnerabilities, tickets, and code commits, the vulnerability management platform enables organizations to identify and address security issues promptly. This reduces the duration during which applications remain vulnerable and increases the chances of addressing potential security risks before they are exploited by attackers. A centralized information repository, the vulnerability management platform's ability to tie together vulnerabilities, tickets, and code commits in a single place creates a centralized knowledgebase. The centralized information repository allows developers and security practitioners to access relevant information quickly, fostering better collaboration and more informed decision-making. In addition, the embodiments herein envisages an up-to-date and relevant knowledge base. The vulnerability management platform's automated linking process and centralized platform help keep the KB current and relevant over time. Outdated information is mitigated, ensuring that developers and security teams have access to accurate and valuable resources for addressing security concerns. Furthermore, the embodiments herein provide an improved collaboration and efficiency. The centralized repository and intelligent linking enable seamless collaboration between development and security teams. This promotes faster and more efficient communication and cooperation, streamlining the process of resolving security issues. The workflow approval for publishing articles ensures that the quality and accuracy of the KB content are maintained. This quality control mechanism prevents the proliferation of multiple articles on the same topic, reducing confusion and ensuring consistency in the information provided. Moreover, the embodiments herein also provides a consistent and controlled knowledge management in documentation and processes, which helps security leaders ensure that best practices and security guidelines are followed uniformly across the organization. Furthermore, by reducing vulnerability exposure time and improving knowledge sharing, the vulnerability management platform supports proactive security practices. The platform empowers organizations to identify and address security issues early, reducing the risk of security breaches and potential financial and reputational damages. In addition, the platform's capabilities to track and manage security-related activities can aid organizations in compliance reporting and audits. Having a centralized and up-to-date repository of security-related data can help demonstrate proactive security measures to compliance regulators. Furthermore, the embodiments herein also provides an enhanced developer productivity, with automated workflows and seamless integration with the development process, the vulnerability management platform streamlines security checks and incident management. This allows developers to focus on coding and application development while maintaining a strong security posture. Therefore, the advantages of the embodiments herein contribute to better security practices, improved collaboration, and proactive security measures. The platform enables organizations to stay ahead of potential threats and vulnerabilities, reducing security risks and enhancing the overall security maturity of their software applications.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phrases or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method for managing knowledge for solving vulnerability issues using an organizational knowledgebase, the method comprising the steps of:
   a. linking vulnerability management platform knowledgebase (KB) articles to an organization's core documents, thereby rendering information contained in the vulnerability management platform knowledgebase articles accessible through authoritative sources, including policy documents, guidelines, and technical specifications of the organization's core documents;
   b. applying a vulnerability management platform formula to enhance knowledge management and security practices within the organizational knowledgebase and wherein the step of applying the vulnerability management platform formula comprises the following steps:

i. tagging at least one of common vulnerabilities and exposures (CVEs) and common weakness enumeration (CWEs) to the vulnerability management platform knowledgebase articles, and wherein the step of tagging at least one of the CVEs and the CWEs involves categorizing the vulnerability management platform knowledgebase articles with standardized identifiers that represent specific vulnerabilities or weaknesses, thereby enabling users to find articles related to specific security issues, and wherein the step of tagging at least one of the CVEs and the CWEs to the vulnerability management platform knowledgebase articles further includes the following steps:
      a. identifying at least one of the CVEs and the CWEs related to the organization's systems, software, and infrastructure, and identifying known vulnerabilities, weaknesses, and exposures likely to impact the organization's assets;
      b. reviewing existing vulnerability management platform knowledgebase articles to identify content that addresses at least one of identified CVEs and CWEs;
      c. adding a new vulnerability management platform knowledgebase article in an event any of the existing vulnerability management platform knowledgebase articles do not cover an identified vulnerability;
      d. linking related CVEs and related CWEs with corresponding vulnerability management platform knowledgebase articles that have been reviewed;
      e. establishing a standardized taxonomy to tag and link the related CVEs and the related CWEs to the corresponding vulnerability management platform knowledgebase articles, such that the standardized taxonomy aligns with the standardized identifiers, said standardized identifiers including CVE identifiers and CWE identifiers; and
      f. verifying that a link between the related CVEs and the related CWEs and the corresponding vulnerability management platform knowledgebase articles is accurate, and thereby enabling the users to search for and find specific CVEs, specific CWEs, and specific vulnerability management platform knowledgebase articles;
   ii. attaching rich articles as links to a ticket tracking system;
   iii. linking the vulnerability management platform knowledgebase articles to a newly created ticket; and
   iv. automatically linking a code commit to the vulnerability management platform knowledgebase articles;
   c. defining and configuring a plurality of Service Level Agreements (SLAs) on at least one of an application level and a sub-application level to set timelines for acknowledging and mitigating security concerns.

2. The method according to claim 1, wherein the vulnerability management platform knowledgebase articles include documentation stored in a vulnerability management platform knowledgebase of a vulnerability management platform, and wherein the vulnerability management platform knowledgebase articles describe at least security best practices, vulnerability explanations, and risk mitigation strategies, and
   wherein the vulnerability management platform knowledgebase is a centralized repository storing a collection of articles, guides, documents, and information related to at least cybersecurity, software development, and vulnerability management.

3. The method according to claim 1, wherein the vulnerability management platform formula includes a set of practices and functionalities that enhance the knowledge management and security practices within the organization, and includes key activities related to the vulnerability management platform knowledgebase articles and integration of the vulnerability management platform knowledgebase articles with the organization's systems.

4. The method according to claim 1, wherein the rich articles are the vulnerability management platform knowledgebase articles that contain information about security vulnerabilities, weaknesses, best practices, and cybersecurity-related topics, and wherein the step of attaching the rich articles as links to the ticket tracking system provides essential contextual information for resolving security-related tasks and issues.

5. The method according to claim 1, wherein the step of linking the vulnerability management platform knowledgebase articles to the newly created ticket includes a step of automatically suggesting the vulnerability management platform knowledgebase articles to be linked to the newly created ticket, thereby providing a context and information related to the context for resolving the newly created ticket.

6. The method according to claim 1, wherein natural language processing (NLP) and contextual analysis are performed during the step of automatically linking the code commit to the vulnerability management platform knowledgebase articles, thereby:

automatically associating the code commit with at least one of a corresponding ticket and a corresponding vulnerability, based on the information contained in the vulnerability management knowledgebase articles linked to the code commit; and establishing a connection between code changes identified by the code commit and the vulnerability management platform knowledgebase articles linked to the code commit, thereby providing contextual information corresponding to the vulnerability management platform knowledgebase articles.

7. The method according to claim 1, wherein the method further includes a step of automatically linking the vulnerability management platform knowledgebase articles to tickets, using a vulnerability management platform runbook.

8. A computer-implemented system for managing knowledge for solving vulnerability issues using an organizational knowledgebase, the system comprising:

a processor; and a memory storing computer-executable instructions which when executed by the processor cause said processor to:

link vulnerability management platform knowledgebase (KB) articles to an organization's core documents, thereby rendering information contained in the vulnerability management platform knowledgebase articles accessible through authoritative sources, including policy documents, guidelines, and technical specifications of the organization's core documents;

apply a vulnerability management platform formula to linked vulnerability management platform knowledgebase articles and the organization's core documents to enhance knowledge management and security practices within the organizational knowledgebase, and wherein the processor is further configured to:

i. common vulnerabilities and exposures (CVEs) and common weakness enumeration (CWEs) to the vulnerability management platform knowledgebase articles and thereby categorize the vulnerability management platform knowledgebase articles with standardized identifiers that represent specific vulnerabilities or weaknesses, thereby enabling users to find articles related to specific security issues, said processor further configured to:

a. identify at least one of the CVEs and the CWEs related to the organization's systems, software, and infrastructure, and identify known vulnerabilities, weaknesses, and exposures likely to impact the organization's assets;

b. review existing vulnerability management platform knowledgebase articles to identify content that addresses at least one of identified CVEs and CWEs;

c. add a new vulnerability management platform knowledgebase article in an event any of the existing vulnerability management platform knowledgebase articles do not cover an identified vulnerability:

d. link related CVEs and related CWEs with corresponding vulnerability management platform knowledgebase articles that have been reviewed;

e. establish a standardized taxonomy to tag and link the related CVEs and the related CWEs to the corresponding vulnerability management platform knowledgebase articles, such that the standardized taxonomy aligns with the standardized identifiers, and where in said standardized identifiers include CVE identifiers and CWE identifiers; and f. verify that the link between the related CVEs and the related CWEs and the corresponding vulnerability management platform knowledgebase articles is accurate, and thereby enable the users to search for and find specific CVEs, specific CWEs, and specific vulnerability management platform knowledgebase articles;

ii. attach rich articles as links to a ticket tracking system;

iii. link the vulnerability management platform knowledgebase articles to a newly created ticket; and iv. automatically link a code commit to the vulnerability management platform knowledgebase articles; and define and configure a plurality of Service Level Agreements (SLAs) on at least one of an application-level GF and a sub-application level to set timelines for acknowledging and mitigating security concerns.

9. The system according to claim 8, wherein the vulnerability management platform knowledgebase articles include documentation stored in a vulnerability management platform knowledgebase of a vulnerability management platform, and wherein the vulnerability management platform knowledgebase articles describe at least security best practices, vulnerability explanations, and risk mitigation strategies, and wherein the vulnerability management platform knowledgebase is a centralized repository storing a collection of articles, guides, documents, and information related to at least cybersecurity, software development, and vulnerability management.

10. The system according to claim 8, wherein the vulnerability management platform formula includes a set of practices and functionalities that enhances the knowledge management and security practices within the organization, and includes key activities related to the vulnerability management platform knowledgebase articles and integration of the vulnerability management platform knowledgebase articles with the organization's systems.

11. The system according to claim 8, wherein the rich articles are the vulnerability management platform knowledgebase articles that contain information about security vulnerabilities, weaknesses, best practices, and cybersecurity-related topics, and wherein the processor provides essential contextual information for resolving security-related tasks or issues by attaching the rich articles as links to the ticket tracking system.

12. The system according to claim 8, wherein the processor is further configured to automatically suggest the vulnerability management platform knowledgebase articles to be linked to the newly created ticket and thereby provide a context and information related to the context for resolving the newly created ticket.

13. The system according to claim 8, wherein the processor is configured to perform natural language processing (NLP) and contextual analysis while linking the code commit to the vulnerability management platform knowledgebase articles, said processor further configured to:

automatically associate the code commit with at least one of a corresponding ticket and a corresponding vulnerability, based on the information contained in the vulnerability management knowledgebase articles linked to the code commit; and establish a connection between code changes identified by the code commit and the vulnerability management platform knowledgebase articles linked to the code commit, thereby providing contextual information corresponding to the vulnerability management platform knowledgebase articles.

14. The system according to claim 8, wherein the processor automatically links the vulnerability management platform knowledgebase articles to tickets, by using a vulnerability management platform runbook.

\* \* \* \* \*